Feb. 20, 1934.    A. W. WOODWARD    1,948,324
WHEEL AND METHOD OF MAKING IT
Filed Jan. 23, 1929
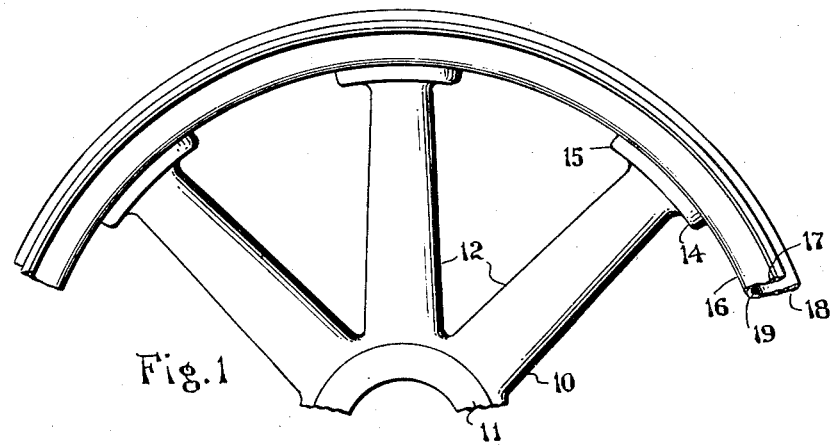
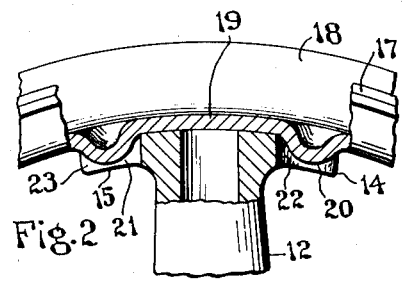
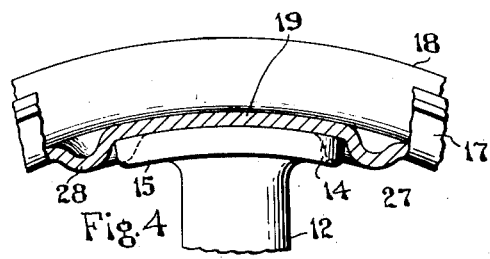
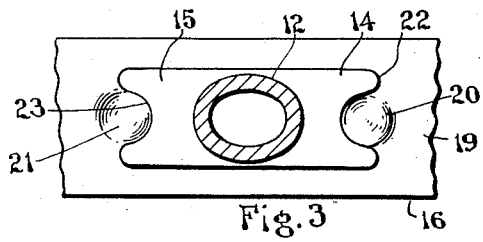
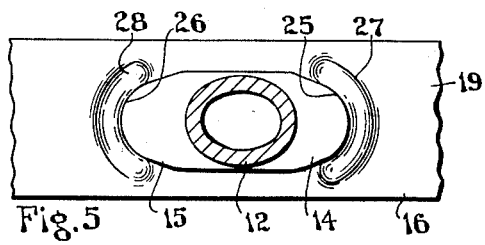
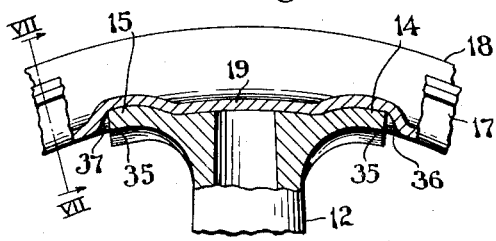
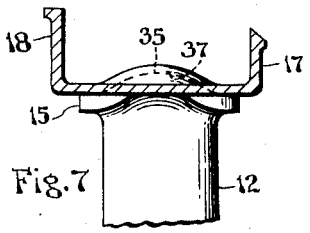
Inventor
Alva W. Woodward
By
Attorney Patented Feb. 20, 1934

1,948,324

UNITED STATES PATENT OFFICE 1,948,324

WHEEL AND METHOD OF MAKING IT

Alva W. Woodward, Akron, Ohio, assignor to Wingfoot Corporation, Wilmington, Del., a corporation of Delaware Application January 23, 1929. Serial No. 334,593

1 Claim. (Cl. 301—67)

This invention relates to vehicle wheels for supporting pneumatic tires and it has particular relation to a wheel of the above designated character having a tire rim supporting felloe rigidly secured directly upon the ends of the spokes.

One object of the invention is to provide a novel and efficient method of securing a rim supporting felloe on the ends of the spokes of a wheel.

Another object of the invention is to provide an improved wheel structure in which the rim supporting felloe is secured rigidly on the ends of the spokes by portions of the former interlocking with portions of the latter.

In certain types of wheel structures, the rim supporting felloe is formed separately from the wheel proper and subsequently is secured upon the ends of the spokes of the wheel in rigid relation thereto. According to one form of this invention, portions of the felloe are pressed around the ends of the spokes thus providing abutments which prevent lateral and circumferential movement of the spokes relative thereto.

Owing to the fact that the relative positions of the abutments and spokes may be observed at any time, their positive engagement may be assured which would not be possible if the spokes and felloe were secured together by inaccessible means. Another form of the invention involves pressing portions of integral flanges on the outer ends of the spokes radially outwardly against the base of the felloe, with sufficient force to form depressions in the felloe which receive the outwardly pressed portions of the flanges.

For a better understanding of the invention, reference may now be had to the accompanying drawing, forming a part of the specification, in which:

Fig. 1 is a fragmentary elevational view of a wheel illustrating a rim supporting felloe rigidly supported on the ends of the spokes;

Fig. 2 is a fragmentary partly cross-sectional view of a wheel showing the manner of securing the felloe to the spokes according to one form of the invention;

Fig. 3 is a fragmentary plan view of the structure shown by Fig. 2;

Fig. 4 is a fragmentary partly cross-sectional view of a wheel in which the spokes and felloe are secured together according to another form of the invention;

Fig. 5 is a fragmentary plan view of the structure shown by Fig. 4;

Fig. 6 is a fragmentary partly cross-sectional view of a wheel in which the spokes and felloe are secured together according to another form of the invention; and Fig. 7 is a cross-sectional view of the construction shown by Fig. 6 taken substantially along the line VII—VII thereof.

Referring to Fig. 1, a wheel 10 is composed of a hub 11 having spokes 12 projecting radially outwardly therefrom. The outer ends of the spokes have oppositely offset circumferentially projecting flanges 14 and 15, in order to provide a relatively large supporting surface for a rim supporting felloe 16 mounted on the ends of the spokes. The felloe 16 is of channel form having a cylindrical base 19 and radially disposed flanges 17 and 18, the latter of which are adapted to retain a pneumatic tire supporting rim, in a manner well known in the art. The manner of securing the felloe 16 on the ends of the spokes forms the principal subject matter of this invention, as will be more particularly referred to hereafter.

Referring now particularly to Figs. 2 and 3, the flanges 14 and 15 on the ends of the spokes 12 are provided at their outer ends with semi-circular recesses 22 and 23, respectively. Initially the felloe is mounted upon the ends of the spokes with its cylindrical base portion 19 resting thereupon, and projections 20 and 21 then are pressed out of the base 19 of the felloe into the semi-circular recesses 22 and 23 in the flanges 14 and 15, respectively. Sufficient pressure is employed in pressing the projections 20 and 21 radially inwardly to insure proper engagement of the latter with the entire edges of the recesses 22 and 23, and owing to the thickness of the metal in the base 19 of the felloe and to the closely fitting engaging surfaces of the elements, the projections are rigidly retained in the recesses.

According to Figs. 4 and 5, the flanges 14 and 15 on the outer ends of the spokes are provided with elliptically curved ends, as indicated at 25 and 26. After mounting the felloe on the ends of the spokes, portions 27 and 28 of the base 19 thereof are pressed inwardly around the ends 25 and 26 of the flanges in firm engagement therewith. Owing to the fact that the portions 27 and 28 are curved about the oppositely curved ends 25 and 26 of the flanges on the spokes, it is apparent that lateral as well as circumferential movement of the felloe relative to the spokes positively is prevented.

According to Figs. 6 and 7, the flanges 14 and 15 on the ends of the spokes are rectangular in shape. Intermediate the circumferentially extending edges of these flanges and contiguous to their outer ends, respectively, portions 35 thereof are pressed radially outwardly against the base 19 of the felloe with sufficient force to provide recesses 36 and 37 in the base of the latter. These recesses are complementary to the pressed out portions 35 and, in conjunction therewith, provide a means which rigidly interlocks the felloe and the spokes.

From the foregoing description, it is apparent that a novel and efficient method has been provided for securing a felloe on the ends of the spokes. It is also apparent that a felloe, secured on the ends of the spokes in this manner, provides a rigid assembly in which both lateral and circumferential relative movement of the felloe and spokes positively is prevented. Moreover, it is apparent that the method of securing the felloe on the spokes is simple and that relatively little expense is involved in forming a wheel in this manner.

Although I have illustrated but the preferred forms which the invention may assume and have described those forms in detail, it will be apparent to those skilled in the art that the invention is not so limited but that various modifications may be made therein without departing from the spirit of the invention or from the scope of the appended claim.

What I claim is:

In combination with a metal wheel comprising a cast metal hub and spoke structure, the spokes having separate enlargements at their outer ends, a wrought metal rim having a relatively thin cylindrical wall embracing the enlargements at the ends of the spokes, of a plurality of angular recesses formed in the outer peripheral edges of said enlargements, and lugs extending from said rim into said recesses for reinforcing the connection between each spoke and the rim against stresses acting axially and circumferentially of the wheel.

ALVA W. WOODWARD.